(12) United States Patent
Brunner

(10) Patent No.: US 9,792,746 B2
(45) Date of Patent: Oct. 17, 2017

(54) SAFETY SYSTEM

(71) Applicant: SICK AG, Waldkirch (DE)

(72) Inventor: Fabio Victor Dominik Brunner, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 15/376,755

(22) Filed: Dec. 13, 2016

(65) Prior Publication Data

US 2017/0206723 A1    Jul. 20, 2017

(30) Foreign Application Priority Data

Jan. 18, 2016 (EP) ..................................... 16151641

(51) Int. Cl.
*G07C 9/00* (2006.01)
*G05D 1/02* (2006.01)
(Continued)

(52) U.S. Cl.
CPC ........ *G07C 9/00309* (2013.01); *B25J 9/1676* (2013.01); *F16P 3/08* (2013.01);
(Continued)

(58) Field of Classification Search
CPC ............ G07C 9/00309; G07C 9/00015; G07C 2009/00428; G05D 1/0214; B25J 9/1676; F16P 3/08; F16P 3/008; F16P 3/10
See application file for complete search history.

(56) References Cited

U.S. PATENT DOCUMENTS 8,115,650 B2 * 2/2012 Dasilva ................ G08B 25/016
340/539.1
2007/0205860 A1 * 9/2007 Jones ................. G05B 19/4183
340/5.61
(Continued)

FOREIGN PATENT DOCUMENTS

| DE | 202 08 788 U1 | 9/2002 |
| WO | 2008/110597 A2 | 9/2008 |
| WO | 2011/090485 A1 | 7/2011 |

OTHER PUBLICATIONS

European Search Report dated Jul. 26, 2016 issued in corresponding European Application No. 16 15 1641.

*Primary Examiner* — Thomas Alunkal
(74) *Attorney, Agent, or Firm* — Nath, Goldberg & Meyer; Jerald L. Meyer

(57) ABSTRACT

A safety system and a method using a safety system having at least one mobile key unit (2) with an evaluation unit (3) and having a key station (4) with a receiver for the key unit (2), wherein at least one spatially restricted access zone (6) is arranged having an access station (7) for a facility (8), wherein the key unit (2) is configured for reading data from at least one checking station (9) within a safety zone (16) of the facility (8), wherein the data comprise identification data for the checking station (9), and wherein the mobile key unit (2) has an interface (10) by means of which the data can be wirelessly transmitted from the checking station (9) to the key unit (2), with the checking unit (9) only being accessible via the access zone (6) so that the access zone (6) can be passed through by a person (17) having the key unit (2) before reaching the checking station (9) and after the leaving of the checking station (9), with the data of the key unit (2) being able to be transmitted to the key station (4) when all the mobile key units (2) are in the key station (4), and with (Continued)

the facility (8) being deactivated or blocked when at least one key unit (2) has been removed from the key station (4).

14 Claims, 1 Drawing Sheet

(51) Int. Cl.
  *B25J 9/16* (2006.01)
  *F16P 3/08* (2006.01)
(52) U.S. Cl.
  CPC ....... *G05D 1/0214* (2013.01); *G07C 9/00015* (2013.01); *G07C 2009/00428* (2013.01)

(56) References Cited

U.S. PATENT DOCUMENTS

| | | | |
|---|---|---|---|
| 2007/0205861 A1* | 9/2007 | Nair | G07C 9/00111 340/5.61 |
| 2008/0273684 A1* | 11/2008 | Profanchik | G08B 13/2417 379/207.02 |
| 2009/0072631 A1* | 3/2009 | Iida | B25J 19/06 307/326 |
| 2012/0119876 A1* | 5/2012 | Shah | F16P 3/08 340/5.53 |
| 2013/0020817 A1* | 1/2013 | Pullmann | E05B 15/022 292/341.17 |
| 2016/0271800 A1* | 9/2016 | Stubbs | B25J 9/1666 |
| 2016/0274586 A1* | 9/2016 | Stubbs | G06K 7/10366 |

* cited by examiner

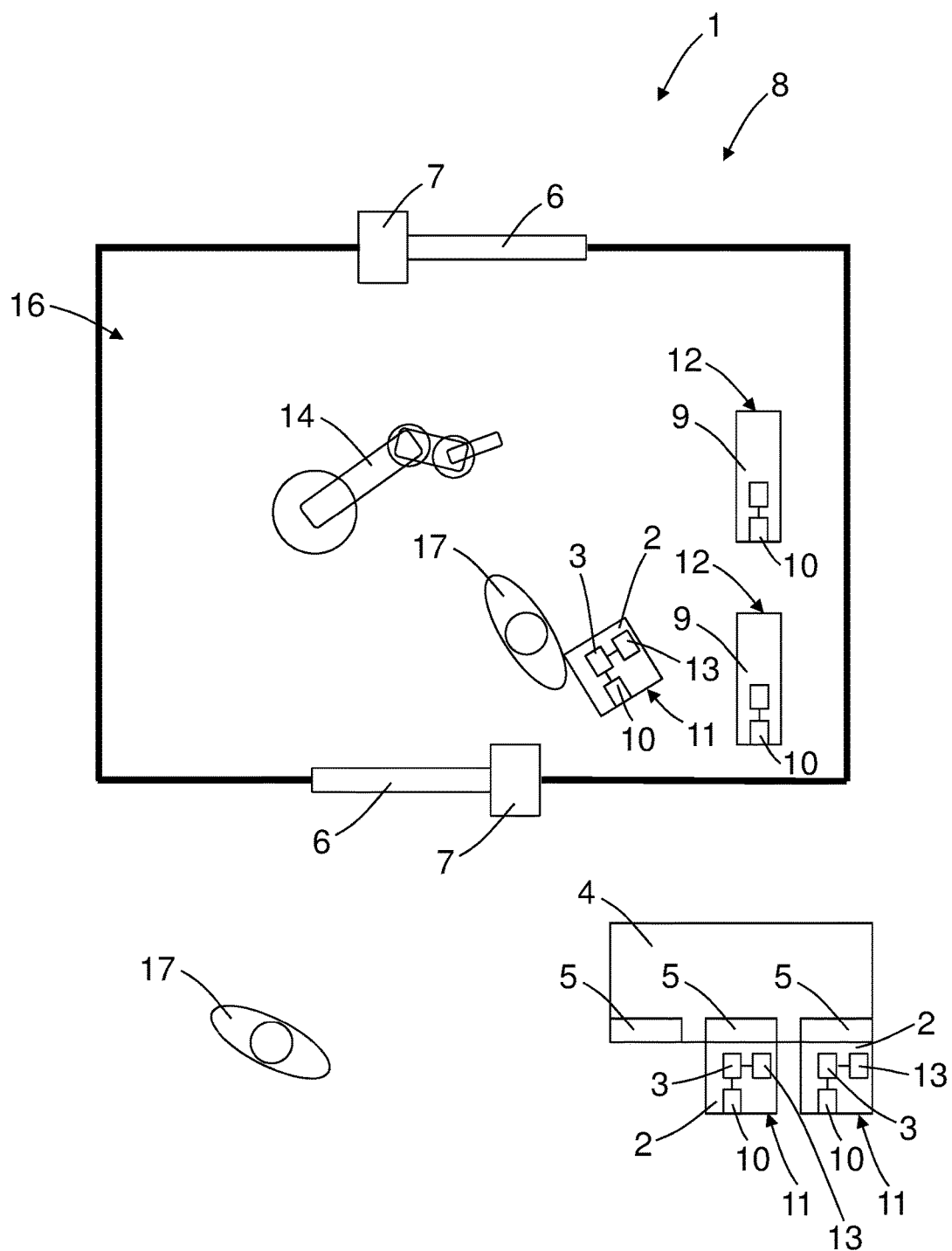

SAFETY SYSTEM

The present invention relates to a safety system having at least one mobile key unit with an evaluation unit and having a key station with a receiver for the key unit, wherein at least one spatially bounded access zone is arranged having an access station for a facility and to a method of using such a safety system.

Provision is made in the safety system having at least one mobile key unit with an evaluation unit and having a key station with a receiver for the key unit, wherein at least one spatially bounded access zone is arranged having at least one access station for a facility, that the facility has to be entered by operators or by service engineers in order, for example, to remedy disturbances or, in the case of service engineers, to service the facility.

The facility is a facility having parts that carry out dangerous movements that represent a danger to persons. The persons have to be protected from the dangerous movement.

The facility can be activated when no persons are in the zone of the facility. The facility must, however, be deactivated when persons are located in the zone of the facility.

It is an object of the invention that a facility can only be activated when no persons are located in a dangerous zone or in a safety zone of the facility.

The object is satisfied in accordance with a safety system having at least one mobile key unit with an evaluation unit and having a key station with a receiver for the key unit, wherein at least one spatially bounded access zone is arranged having an access station for a facility, wherein the key unit is configured for reading data of at least one checking station within a safety zone of the facility, wherein the data comprise identification data for the checking station, and wherein the mobile key unit has an interface by means of which the data can be wirelessly transmitted from the checking station to the key unit, with the checking unit only being accessible via the access zone so that the access zone can be passed through by a person having the key unit before reaching the checking station and after the leaving of the checking station, with the data of the key unit being able to be transmitted to the key station, with the facility being activated or released when all the mobile key units are in the key station, and with the facility being deactivated or blocked when at least one key unit is removed from the key station.

The object is further satisfied by a method using a safety system having at least one mobile key unit with an evaluation unit and having a key station with a receiver for the key unit, wherein at least one spatially bounded access zone is arranged having an access station for a facility, wherein the key unit reads out data from at least one checking station within a safety zone of the facility, wherein the data comprise identification data for the checking station, and wherein the mobile key unit has an interface by means of which the data are wirelessly transmitted from the checking station to the key unit, with the checking unit only being accessible via the access zone so that the access zone has to be passed through by a person having the key unit before reaching the checking station and after the leaving of the checking station, with the data of the key unit being transmitted to the key station, with the facility being activated or released when all the mobile key units are in the key station, and with the facility being deactivated or blocked when at least one key unit is removed from the key station.

The safety system is a safety system in accordance with the safety of machinery, for example in accordance with the standard EN/ISO 13849-1 or with the standard EN/IEC 62061 that, for example, provides the framework for functional safety of safety-related electronic control systems and their subsystems at machines.

The key unit in accordance with the invention can have a very simple configuration. It is, for example, a manageable unit that can be carried or taken along by one person without problem. The key unit optionally has operating elements and at least one display element.

The key unit furthermore has an evaluation unit. The evaluation unit is formed by a microcontroller, for example. The key unit furthermore has a memory to store data on the key unit.

The key station is arranged outside the safety zone. The key station receives the at least one key unit it a receiver. The receiver can be a drawer or a rack, for example. The key station is configured to read out the key unit and to evaluate the data of the key unit in an evaluation unit. The key station is further configured to influence the facility directly or indirectly, that is to activate or deactivate the facility.

The access zone is a spatially bounded access zone having an access station, for example a gate or a door. The safety zone of the facility is only accessible through this access zone. A plurality of access zones can also be arranged. This can in particular be sensible with very large facilities having a plurality of safety zones, for example.

The access station can, for example, have electronic means such as an electronic door switch, whereby a check can be made whether the access zone has been opened.

The facility can, for example, be an industrial facility for manufacturing products. It is, for example, in this respect a part of a production plant for automobiles. The facility can also be a part of a machine or a facility having a plurality of machines. The facility has a safety zone that may not be entered by persons when the facility is active since the person may be in danger from parts of the facility. The facility is, for example, one or more robots whose dangerous action zone is disposed within the safety zone.

The checking station is arranged within the safety zone. The checking station is in this respect arranged in a fixed position so that it cannot be removed. The checking station is integrated in the facility, for example.

The checking station includes at least data for identification that can be invoked wirelessly via an interface by the key unit. The interface is preferably a radio interface. The interface can, however, optionally also be an optical interface.

In accordance with the invention, the key unit always has to be taken along by the person to reach the checking station. If the person were not to take along the key unit, the facility can also not be activated again. A later activation of the facility, namely after leaving the safety zone and after returning the key unit in the key station is only possible when the key unit can invoke or read data at the checking station. A location code or a station code is, for example transmitted to the key unit by the checking station or is read from the checking station by the key unit for this purpose.

The check of the key unit at the checking station can take place automatically. I.e. if the person has approached the checking station up to a specific minimum distance, the data of the checking station will be automatically read by the key unit.

The person who takes along the key unit must optionally himself carry out a check at the checking station. Provision can be made for this purpose, for example, that an action, for example an actuation of a button at the key unit, has to be carried out by the person, for example. It is thereby ensured that the checking station is not automatically checked by the key unit, but rather that an active action of the person is always required to check it.

In accordance with the invention, how many persons are located in the facility or in the safety zone is always known by the key station. For example, it can simply be determined at the key station whether at least one key unit is missing and, if yes, how many key unit are missing. The facility can only be activated if all the provided key units are present in or at the key station.

The checking station can likewise be of a very simple design. In the simplest case, the checking station has a memory and an interface for data provision.

A plurality of checking stations are optionally provided. A plurality of checking stations are in particular provided with large facilities or large safety zones or with large facilities having a plurality of safety zones. Provision can be made in this respect that the key unit has to be checked at at least one checking station. Provision can, however, also be made that a key unit has to be checked at a plurality of checking stations. Provision can optionally also be made that the key unit has to be checked at a plurality of checking stations in a specific order.

The communication between the key unit and the checking station can take place unidirectionally or bidirectionally. In the simplest case, a simple reading of the data from the checking station is sufficient. Provision can, however, also be made that data are written from the key unit to the checking station.

Provision is optionally made that the key units can only be removed from the key station by authorized persons. The authorized persons such as operators or service engineers must register at the key station with the aid of an electronic identity card or with the aid of another means of identification, for example, to obtain a key unit. A start code is, for example, transmitted from the key station to the key unit on the removal of the key unit.

The key units can in this respect also be assigned to specific persons so that a specific key unit can only be taken up or taken along by a specific person.

In a further development of the invention, the key unit has at least one RFID reading device, in particular an RFID read/write module, and the checking station has at least one RFID transponder.

The checking station is thereby of a very simple design, namely only with a simple, inexpensive RFID transponder.

The RFID reading unit has an antenna arrangement for communication with the checking station, which is configured as an RFID transponder, with the transponder comprising at least one coil for interaction with the antenna arrangement of the RFID reading device.

RFID (radio frequency identification) systems are used in transceiver systems for the automatic and contactless identification and/or localization of RFID transponders using radio waves. An RFID system typically first comprises the RFID transponder (also called a "tag") that comprises an antenna and that is located at or in the checking station. As a rule, it comprises a characterizing identification data code that can be queried via the antenna arrangement by the RFID reading device of the RFID system (also called a "transceiver"). The RFID reading device for this purpose comprises the antenna arrangement and a transceiver circuit (e.g. the EM4095 chip of EM Microelectronics) for reading out this code from the RFID transponder. The RFID reading device typically generates alternating magnetic fields to transmit signals to the RFID transponder to read out the code from the RFID transponder. The RFID transponder is configured to send back a signal comprising data, in particular the code, as a response to the RFID reading device after receipt of a corresponding signal from the RFID reading device and the RFID reading device evaluates it with the evaluation unit and further processes it.

In RFID systems, the RFID reading device generates alternating magnetic fields that are not only provided for transmitting the data, but that can also serve to supply the RFID transponders with energy.

An RFID system thus has the advantage that the RFID transponder does not require its own power supply and can therefore be used in a flexible manner. The RFID transponder draws its energy via radio waves from the RFID reading device. The RFID transponder is addressed via the antenna arrangement of the RFID reading device and responds to the RFID reading device with a piece of information stored in the RFID transponder. The information transmitted by the transponder of the RFID system is received by the antenna arrangement and can subsequently be evaluated in the evaluation unit. The stored information on the transponder includes at least one code, namely the identification data that identify the RFID transponder.

Since the recognition of the RFID transponder takes place over radio waves, the system is very robust with respect to environmental influences. The RFID reading system can therefore be used with the RFID transponder in very rough environments, for example in industrial environments where lubricants are used and where, for example, a high degree of contamination can occur.

Since the recognition of the RFID transponder takes place over radio waves, a line of sight is not necessary between the key unit and the checking station, unlike with an optical solution. The key unit and the checking station can therefore be completely encapsulated to protect them from harmful environmental influences.

In a further development of the invention, the access station of the access zone can be locked and can only be passed through with the key unit.

An unauthorized access is thereby prevented and only an authorized person, who is namely in possession of the key unit, can enter into the safety zone.

The safety for persons is thereby increased since the safety zone can no longer be entered unintentionally. The availability of the facility is thereby increased. For example, an electronic guard lock can be located as a lock at the access station that automatically releases the access zone if the person is carrying the key unit.

In a particularly preferred embodiment of the invention, a times is started with a first time value in the key unit on a removal of the key unit from the key station.

It is thus ensured that the person has left the safety zone again within a prescribed time. If this time is not observed, a warning message can, for example, take place to look for the person in question.

In accordance with a preferred further development of the invention, the timer is checked on the reaching of the checking station and if the first time value has not been reached, a valid reaching of the checking station is signaled and stored in the key unit and if the first time value has been exceeded, an invalid reaching of the checking station is signaled and stored in the key unit. The localization code or the station code is in this respect linked to the first time value by the key unit.

If the time has been exceeded, the facility cannot be started. The person is prompted to restart the routine. The person again removes the key unit from the key station for this purpose, with a first time value again being set. The person again has to visit the checking station within a first time.

In a further development of the invention, a timer is started with a second time value in the key unit on the reaching of the checking station by the key unit.

It is thus further ensured that the person has left the safety zone again within a prescribed time. If this second time value is not observed, a warning message can, for example, take place to look for the person in question.

In a further development of the invention, the second time value is checked on the reaching of the key station and if the second time value has not been reached, a valid reaching of the checking station is signaled and stored in the key unit and if the second time value has been exceeded, an invalid reaching of the key station is signaled and stored in the key unit. In every case, the key unit receives a stop signal at the key station, whereby the start code is canceled or reset again.

If the time has been exceeded, the facility cannot be started. The person is prompted to restart the routine. The person again removes the key unit from the key station for this purpose, with a first time value again being set. The person must again visit the checking station within the first time value and to visit the key station within the second time value.

Provision is made in an alternative embodiment that the key unit has at least one RFID transponder and the checking station has at least one RFID reading device. In this respect, the data are read from the key unit by the checking station and data are optionally written to the key unit. In accordance with this solution, the key unit can be of a very simple design and the checking station can check whether a key unit is located in the proximity of the checking station.

The invention will also be explained in the following with respect to further advantages and features with reference to the enclosed drawing and to embodiments. The FIGURE of the drawing shows in:

FIG. 1 a safety system in accordance with the present invention.

In the following FIGURE, identical parts are provided with identical reference numerals.

FIG. 1 shows a safety system 1 having at least one mobile key unit 2 with an evaluation unit 3 and having a key station 4 with a receiver for the key unit 2. The safety system 1 is shown in a plan view from above.

At least one spatially bounded access zone 6 is arranged having an access station 7 for a facility 8, with the key unit 2 being configured for reading data from at least one checking station 9 within a safety zone 16 of the facility 8, with the data comprising identification data for the checking station 9.

The mobile key unit 2 has an interface 10 by means of which the data can be wirelessly transmitted from the checking station 9 to the key unit 2.

The checking station 9 is only accessible via the access zone 6 such that the access zone 6 can only be passed through by a person 17 having the key unit 2 before reaching the checking station 9 and after leaving the checking station 9, with the data of the key unit 2 being able to be transmitted to the key station 4.

The facility 8 is activated or released when all the mobile key units 2 are in the key station 4 and the facility 8 is deactivated or blocked when at least one key unit 2 has been removed from the key station 4, as is shown in FIG. 1.

The key unit 2 is, for example, a manageable unit that can be carried or taken along by one person 17 without problem. The key unit 2 optionally has operating elements and at least one display element.

The key unit 2 furthermore has the evaluation unit 3. The evaluation unit 3 is formed by a microcontroller, for example. The key unit furthermore has a memory to store data on the key unit 2.

The key station 4 is arranged outside the safety zone 16. The key station 4 receives the at least one key unit 2 in a receiver 5. The receiver 5 can be a drawer or a rack, for example. The key station 4 is configured to read out the key unit 2 and to evaluate the data of the key unit 2 in an evaluation unit. The key station 4 is further configured to influence the facility 8 directly or indirectly, that is to activate or deactivate the facility 8. The facility comprises a robot 14, for example.

The access zone 6 is a spatially bounded access zone 6 having an access station 7, for example a gate or a door. The safety zone 16 of the facility is only accessible through this access zone 6. A plurality of access zones 6 can also be arranged. This can in particular be sensible with very large facilities having a plurality of safety zones 16, for example.

The access station 7 can, for example, have electronic means such as an electronic door switch, whereby a check can be made whether the access zone has been opened.

The facility 8 can, for example, be an industrial facility for manufacturing products. The facility 8 has a safety zone 16 that may not be entered by persons 17 when the facility 8 or the robot 14 of the facility 8 is active since the persons 17 may be at risk from parts of the facility 8. The facility 8 is, for example, one or more robots 14 whose dangerous action zone is disposed within the safety zone 16.

The checking station 9 is arranged within the safety zone 16. The checking station 9 is in this respect arranged in a fixed position so that it cannot be removed.

The checking station 9 includes at least data for identification that can be invoked wirelessly via an interface 10 from the key unit 2. The interface 10 is preferably a radio interface.

In accordance with FIG. 1, the key unit 2 always has to be taken along by the person 17 to reach the checking station 9. If the person were not to take along the key unit 2, the facility 8 can also not be activated again. A later activation of the facility 8, namely after leaving the safety zone 16 and after returning the key unit 2 in the key station 4 is only possible when the key unit 2 can invoke or read data at the checking station 9.

The check of the key unit 2 at the checking station 9 can take place automatically. I.e. if the person has approached the checking station 9 up to a specific minimum distance, the data of the checking station 9 will be automatically read from the key unit 2.

The person who takes along the key unit 2 must optionally himself carry out a check at the checking station 9. Provision can be made for this purpose, for example, that an action, for example an actuation of a button at the key unit 2, has to be carried out by the person 17, for example. It is thereby ensured that the checking station 9 is not automatically checked by the key unit 2, but rather that an active action of the person 17 is always required to check it.

In accordance with FIG. 1, how many persons 17 are located in the facility 8 or in the safety zone 16 is always known by the key station 4. In accordance with FIG. 1, one person 17 is located in the facility 16. For example, it can simply be determined at the key station 4 whether at least one key unit 2 is missing and, if yes, how many key units 2 are missing. The facility 8 can only be activated if all the provided key units 2 are present in or at the key station 4.

In the simplest case, the checking station 9 has a memory and an interface 10 for data provision.

In accordance with FIG. 1, a plurality of checking stations 9 are optionally provided. Provision can be made in this respect that the key unit 2 has to be checked at at least one checking station 9. Provision can, however, also be made that a key unit 2 has to be checked at a plurality of checking stations 9. Provision can optionally also be made that the key unit 2 has to be checked at a plurality of checking stations 9 in a specific order.

The communication between the key unit 2 and the checking station 9 can take place unidirectionally or bidirectionally. In the simplest case, a simple reading of the data from the checking station 9 is sufficient. Provision can, however, also be made that data are written from the key unit 2 to the checking station 9.

In accordance with FIG. 1, provision is optionally made that the key units 2 can only be removed from the key station 4 by authorized persons 17. The authorized persons 17 such as operators or service engineers must register at the key station 4 with the aid of an electronic identity card or with the aid of another means of identification, for example, to obtain a key unit 2.

The key units 2 can in this respect also be assigned to specific persons 17 so that a specific key unit 2 can only be taken up or taken along by a specific person 17.

In accordance with FIG. 1, the key unit 2 has at least one RFID reading device 11, in particular an RFID read/write device, and the checking station 9 has at least one RFID transponder 12.

In accordance with FIG. 1, the access station 7 of the access zone 6 can optionally be locked and can only be passed through with the key unit 2. For example, an electronic guard lock can be located as a lock at the access station 7 that automatically releases the access zone 6 if the person 17 is carrying the key unit 2.

In accordance with FIG. 1, a timer 13 is started with a first time value in the key unit 2 on a removal of the key unit 2 from the key station 4.

If this time is not observed, a warning can, for example, take place to look for the person 17 in question.

In accordance with FIG. 1, the timer 13 is checked on the reaching of the checking station 9 and if the first time value has not been reached, a valid reaching of the checking station 9 is signaled and stored in the key unit 2 and if the first time value has been exceeded, an invalid reaching of the checking station 9 is signaled and stored in the key unit 2.

If the time has been exceeded, the facility 8 cannot be started. The person 17 is prompted to restart the routine. The person 17 again removes the key unit 2 from the key station 4 for this purpose, with a first time value again being set. The person 17 has to again visit the checking station 9 within a first time.

In accordance with FIG. 1, a timer 13 is started with a second time value in the key unit 2 on the reaching of the checking station 9 by the key unit.

If this second time value is not observed, a warning can, for example, take place to look for the person 17 in question.

In accordance with FIG. 1, the second time value is checked on the reaching of the key station 4 and if the second time value has not been reached, a valid reaching of the key station 4 is signaled and stored in the key unit 2 and if the first time value has been exceeded, an invalid reaching of the key station 4 is signaled and stored in the key unit 2.

If the time has been exceeded, the facility 8 cannot be started. The person 17 is prompted to restart the routine. The person 17 again removes the key unit 2 from the key station 4 for this purpose, with a first time value again being set. The person must again visit the checking station 9 within the first time value and visit the key station 4 within the second time value.

REFERENCE NUMERALS 1 safety system
2 mobile key unit
3 evaluation unit
4 key station
5 receiver
6 access zone
7 access station
8 facility
9 checking station
10 interface
11 RFID reading device
12 RFID transponder
13 timer
14 robot
16 safety zone
17 person

The invention claimed is:

1. A safety system comprising:
at least one mobile key unit with an evaluation unit and
a key station with a receiver for the mobile key unit,
wherein at least one spatially bounded access zone is arranged having an access station for a facility,
wherein the mobile key unit is configured for reading data from at least one checking station within a safety zone of the facility, with the data comprising identification data for the checking station, and with the mobile key unit having an interface by means of which the data can be wirelessly transmitted from the checking station to the mobile key unit,
wherein the checking station is only accessible via the access zone such that the access zone can only be passed through by a person having the mobile key unit before reaching the checking station and after leaving the checking station, with the data of the mobile key unit being able to be transmitted to the key station; and
wherein the facility is configured to be activated when all the mobile key units are in the key station and the facility to be deactivated when at least one mobile key unit has been removed from the key station.

2. The safety system in accordance with claim 1, wherein the mobile key unit has at least one RFID reading device and the checking station has at least one RFID transponder.

3. The safety system in accordance with claim 1, wherein the access station of the access zone is configured to be locked and to only be passed through with the mobile key unit.

4. The safety system in accordance with claim 1, further comprising a timer, with the timer being configured to be started with a first time value in the mobile key unit on a removal of the mobile key unit from the key station.

5. The safety system in accordance with claim 4, wherein the timer is configured to be checked on the reaching of the checking station and if the first time value has not been reached, a valid reaching of the checking station can be signaled and if the first time value is exceeded, an invalid reaching of the checking station can be signaled.

6. The safety system in accordance with claim 1, further comprising a timer, with the timer being configured to be started with a second time value in the mobile key unit on the reaching of the checking station by the mobile key unit.

7. The safety system in accordance with claim 6, wherein the timer is configured to be checked on the reaching of the key station and if the second time value has not been reached, a valid reaching of the key station can be signaled and if the second time value is exceeded, an invalid reaching of the key station can be signaled.

8. A method using a safety system having at least one mobile key unit with an evaluation unit and having a key station with a receiver for the mobile key unit, wherein at least one spatially bounded access zone is arranged having an access station for a facility, the method comprising the steps of:

reading data from at least one checking station within a safety zone of the facility by means of the mobile key unit, with the data comprising identification data for the checking station, and with the mobile key unit having an interface by means of which the data is wirelessly transmitted from the checking station to the mobile key unit, wherein the checking station is only accessible via the access zone so that the access zone has to be passed through by a person having the mobile key unit before reaching the checking station and after leaving the checking station, with the data of the mobile key unit being transmitted to the key station;

activating the facility when all the mobile key units are in the key station; and deactivating the facility when at least one mobile key unit has been removed from the key station.

9. The method in accordance with claim 8, wherein the mobile key unit has at least one RFID reading device and transmits an RFID reading signal and the checking station has at least one RFID transponder that responds to the RFID reading signal of the RFID reading device.

10. The method in accordance with claims 8, wherein the access station of the access zone is locked and can only be passed through with the key device.

11. The method in accordance with claim 8, further comprising the step of:

starting a timer with a first time value in the mobile key unit on a removal of the mobile key unit from the key station.

12. The method in accordance with claim 11, further comprising the steps of:

checking the timer on the reaching of the checking station and signaling a valid reaching of the checking station if the first time value has not been reached and signaling an invalid reaching of the checking station if the first time value is exceeded.

13. The method in accordance with claim 8, further comprising the step of:

starting a timer with a second time value in the mobile key unit on the reaching of the checking station by the mobile key unit.

14. The method in accordance with claim 8, further comprising the steps of:

checking the timer on the reaching of the key station and signaling a valid reaching of the key station if the second time value has not been reached and signaling an invalid reaching of the key station if the second time value is exceeded.

* * * * *